United States Patent [19]
Carver

[11] Patent Number: 6,128,024
[45] Date of Patent: Oct. 3, 2000

[54] POLAR CONTROLLER FOR DEFINING AND GENERATING SPIRAL-LIKE SHAPES

[75] Inventor: Brett K. Carver, Santa Rosa, Calif.

[73] Assignee: Hewlett-Packard Company, Palo Alto, Calif.

[21] Appl. No.: 08/993,617

[22] Filed: Dec. 18, 1997

[51] Int. Cl.[7] .............................. G06T 3/00; G06T 3/60; G06T 11/20
[52] U.S. Cl. .......................................................... 345/441
[58] Field of Search .................................... 345/441, 442

[56] References Cited

U.S. PATENT DOCUMENTS

| | | | |
|---|---|---|---|
| 5,123,333 | 6/1992 | Riley et al. | 364/474.05 |
| 5,490,241 | 2/1996 | Mallgren et al. | 345/441 |
| 5,535,317 | 7/1996 | Tanaka et al. | 345/440 |
| 5,627,949 | 5/1997 | Letcher, Jr. | 345/441 |
| 5,784,068 | 7/1998 | Brown | 345/441 |
| 5,793,377 | 8/1998 | Moore | 345/418 |
| 5,844,572 | 1/1998 | Schott | 345/441 |
| 5,856,828 | 1/1999 | Letcher, Jr. | 345/440 |
| 5,883,625 | 3/1999 | Crawford et al. | 345/340 |
| 5,909,192 | 1/1999 | Finch et al. | 345/440 |
| 5,912,668 | 6/1999 | Sciammarella et al. | 345/340 |
| 6,012,072 | 3/1999 | Lucas et al. | 346/434 |

OTHER PUBLICATIONS

Anonymous. "A Programming Example". published by Hwelett–Packard, Inc. Obtained from the Software Patent Institute, reprinted as pp. 1–4, Nov. 1991.

Fuller, James E. "Using AutoCAD: release 12 with AME, AutoSHAPE, AutoLISP, and Customizing, 6th ed.", New York: Delmar Publishers, Inc, pp. 7/5–8, 9/11, 9/20, 9/23–26, 20/8–9, 11/7, 11/9, 11/22, 22/11–13, Dec. 1993.

Jacobson, Joe. "Computer Art for the Tektronix", Creative Computing, vol. 9, pp. 192–195, reprinted as 1*—3*, Jan. 1983.

Seiter, Charles. "TeMath—Reviews", Macworld, vol. 9, No. 4, p. 206, Apr. 1992.

Walton, D.J., and Meek, D.S., "A Pythogorean Hodograph Quintic Spiral", Computer Aided Design, vol. 28, No. 12, pp. 943–950, Dec. 1996.

De Jong, Marvin. "Plotting Polar Graphs eith the Apple II", Compute!, v. 6, n. 2, pp. 62–66, Feb. 1982.

Bechert, Thomas E., "Computer–aided Graphical Design of Feedback System Controllers Using the Rotated Inverse Polar Plot", Computers in Education Journal, v. 6, n. 1, pp. 26–31, Jan. 1996.

Jacobson, Joe. "Computer Art for the Tektronix (with illustrations)", Creative Computing, v. 9, pp. 192–195, Jan. 1983.

Simoni, Richard T., "The Intricate Graphs of Polar Functions", Creative Computing, v. 6, n. 6, pp. 104–107 Jun. 1980.

Virtuoso™ Parameterized Cell Reference Manual, Version 4.2.1, Sep. 1992, available from Cadence, having a business address of 555 River Oaks Parkway, San Jose, CA 95134–1917.

*Primary Examiner*—Mark R. Powell
*Assistant Examiner*—Jeffrey Allen Rossi

[57] ABSTRACT

A polar controller takes user-input to specify the creation of graphic shapes. An interface of the polar controller receives from a user a start angle, a stop angle, a step angle and a radius length for the graphic shape. A polar execution engine of the polar controller generates the graphic shape based on the start angle, the stop angle, the step angle and the radius length. For example, when the radius length is expressed as a function of angle, the polar controller is able to draw spiral-like shapes.

21 Claims, 11 Drawing Sheets

POLAR CONTROL DEFINITION

ANGLE SWEEP:
- ■ RADIANS (71)
- ☐ DEGREES (72)

START (NAME OR EXPRESSION): [73]

STOP (NAME OR EXPRESSION): [74]

STEP (NAME OR EXPRESSION): [75]

RADIUS AS A FUNCTION OF ANGLE
RADIUS (NAME OR EXPRESSION): [76]

INCREMENTAL OFFSET
X OFFSET (NAME OR EXPRESSION): [77]

Y OFFSET (NAME OR EXPRESSION): [78]

[OK (79)] [CANCEL (80)] [HELP (81)]

— 70

POLAR CONTROLLER FOR DEFINING AND GENERATING SPIRAL-LIKE SHAPES

BACKGROUND

The present invention concerns generation of graphics using a computing system and pertains particularly to a polar controller for generating spiral-like shapes.

Computer Aided Engineering (CAE) software is used for a variety of purposes. For example, electrical engineers often use CAE software to design circuits.

When using CAE software, a productivity engineer or a circuit designer may discover that artwork desirable for a particular project is not included with the CAE software. In order to generate the desired artwork, it is then necessary to modify an existing artwork macro or create a new artwork macro. Alternatively, an internal macro language such as the Application Extension Language (AEL) may be used to generate an appropriate macro.

Programming in an internal macro language such as the Application Extension Language (AEL) can require a significant amount of expertise. Therefore, various attempts have been made to make it easier for a designer to generate a library of useful variable graphics which can be used for a variety of purposes.

For example, the Virtuoso™ Parameterized Cell Reference Manual, Version 4.2.1, September 1992, available from Cadence, having a business address of 555 River Oaks Parkway, San Jose, Calif. 95134-1917, describes a product which uses parameterized cells as graphic, programmable cells which can be customized. Each parameterized cell includes a graphic layer and assigned parameters. Using the parameterized cell, instances can be created in which parts of the parameterized cell may be repeated or stretched.

While products exist to allow some generation of parameterized cells, the types of shapes that can be produced simply and efficiently are limited. For example, there is no straightforward way to generate spiral-like shapes. The present invention solves this lack in the prior art.

SUMMARY OF THE INVENTION

In accordance with the preferred embodiment of the present invention, a polar controller generates a graphic shape. An interface of the polar controller receives from a user a start angle, a stop angle, a step angle and a radius length for the graphic shape. A polar execution engine of the polar controller generates the graphic shape based on the start angle, the stop angle, the step angle and the radius length. For example, when the radius length is expressed as a function of angle, the polar controller is able to generate spiral-like shapes.

Additionally, in the preferred embodiment, the interface is additionally adapted to receive from the user an x offset and a y offset. When an x offset and a y offset are specified by a user, the polar execution engine generates the graphic shape also based on the x offset and the y offset.

In the preferred embodiment, the polar controller evaluates once any equation the user uses to specify the start angle, evaluates once any equation the user uses to specify the stop angle, evaluates once any equation the user uses to specify the step angle, and evaluates for each step any equation the user uses to specify the radius length. When an x-offset and a y-offset are specified, the polar execution engine evaluates for each step any equation the user uses to specify the x-offset, and evaluates for each step any equation the user uses to specify the y-offset.

Also in the preferred embodiment, the polar execution engine generates the graphic shape based on a selected shape, and a construction line. When the construction line is specified as not intersecting the selected shape, the polar execution engine generates the graphic shape by copying the selected shape. When the construction line is specified as intersecting the selected shape, the polar execution engine generates the graphic shape by expanding the selected shape.

The present invention allows for great flexibility in generating graphic shapes. For example, the present invention allows the simple generating of spiral-like shapes by allowing radius length to be expressed as a function of angle, and by evaluating the radius length at each step.

BRIEF DESCRIPTION OF THE DRAWINGS

FIG. 5 is a dialog box for a polar controller in accordance with a preferred embodiment of the present invention.

DESCRIPTION OF THE PREFERRED EMBODIMENT

Figure 1:
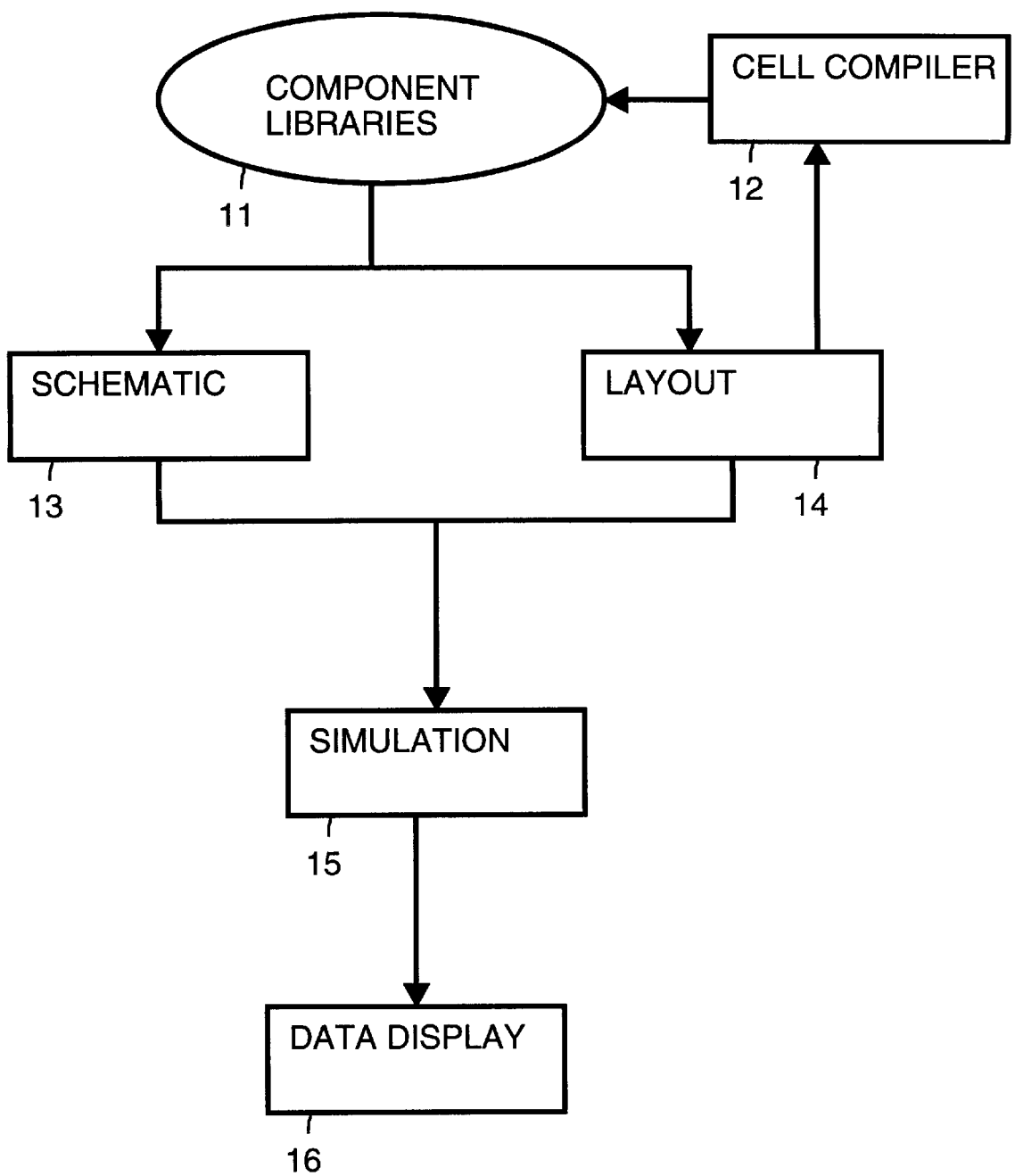
FIG. 1 is a simplified general overview flowchart which illustrates a design process using a graphical cell compiler and component libraries.

FIG. 1 is a simplified general overview flowchart which illustrates a design process using a graphical cell compiler 12 to generate entries in component libraries 11. A designer uses CAE software to work with a schematic 13 and a layout 14. When a circuit design is completed, and possibly during various stages of development, simulation 15 is performed and the results are shown in a data display 16.

When desired artwork is not supplied as part of the CAE software, graphical cell compiler 12 can be used to generate complex parameterized artwork macros (PAMS).

Figure 2:
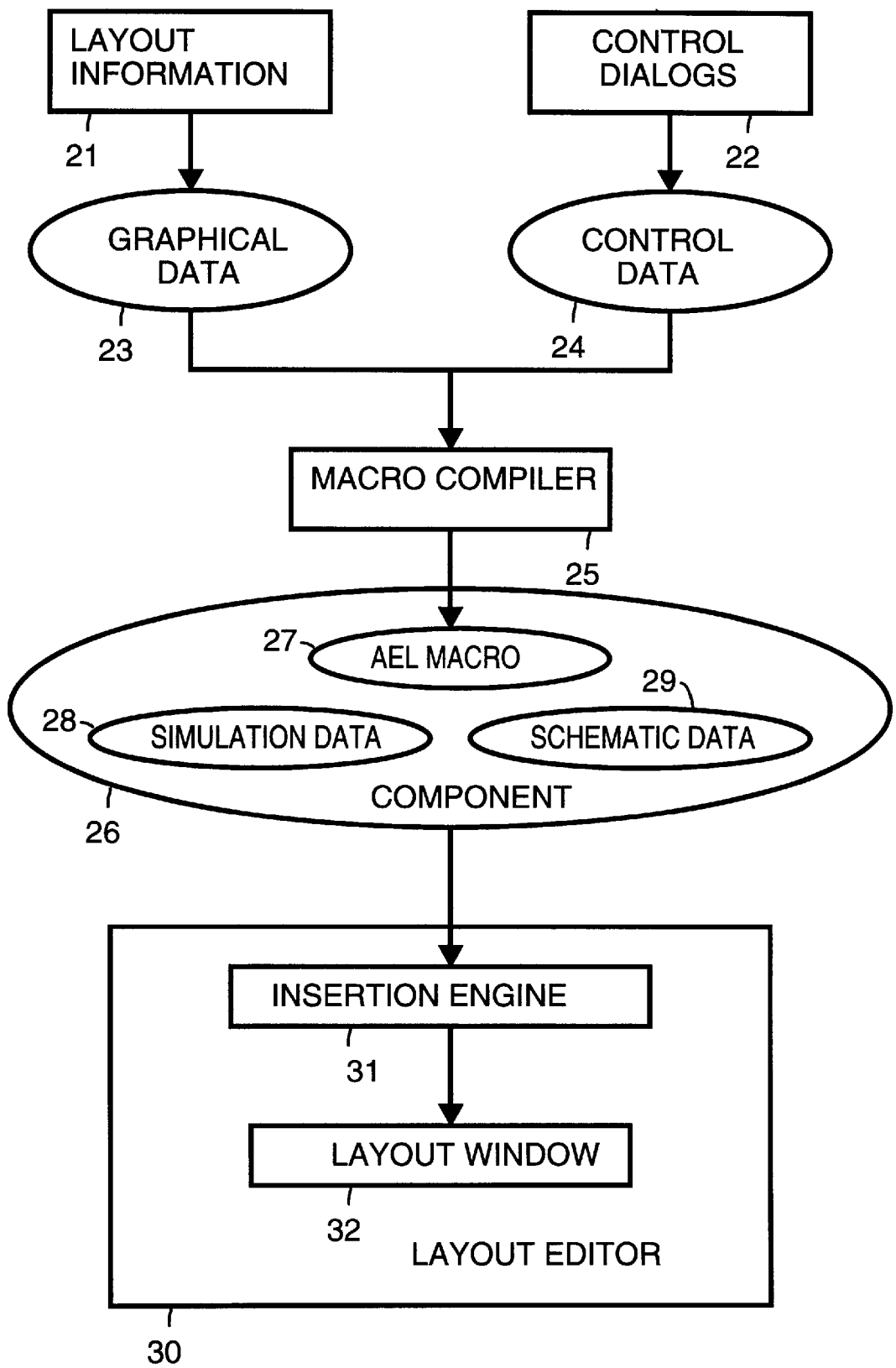
FIG. 2 is a flowchart which illustrates flow of control information and layout information through the graphical cell compiler shown in FIG. 1.

FIG. 2 is a flowchart which illustrates flow of control and data through graphical cell compiler 12. Layout information 21 is obtained a layout window 14 is the source of graphical data 23. Control dialogs 22 are dialog boxes which allow the user to enter the information which defines the operations on graphical data 23. The information is stored as control data 24.

A macro compiler 25 generates an Application Extension Language (AEL) macro 27 within a component 26. Component 26 is stored in components library 11. Within component 26, simulation data 28 and schematic data 29 are also included.

A layout editor 30 uses an insertion engine 31 to place component 26 inside a layout window 32.

In order to generate a PAM, a designer defines the artwork graphically in a Layout window (represented by layout information 21), typically using a layout editor. The designer then defines parameters to effect the artwork. Macro compiler 25 is used to compile the macro. The compiled macro 27 may then be stored as part of a component 26 within component libraries 11 (shown in FIG. 1) for later use by the designer. For storage within component libraries 11, default values are generally assigned to the parameters for the compiled macro. A designer may then utilize the macro in a current layout (represented by layout window 32). The designer edits the parameters as desired for each instance of the macro used.

Figure 3:
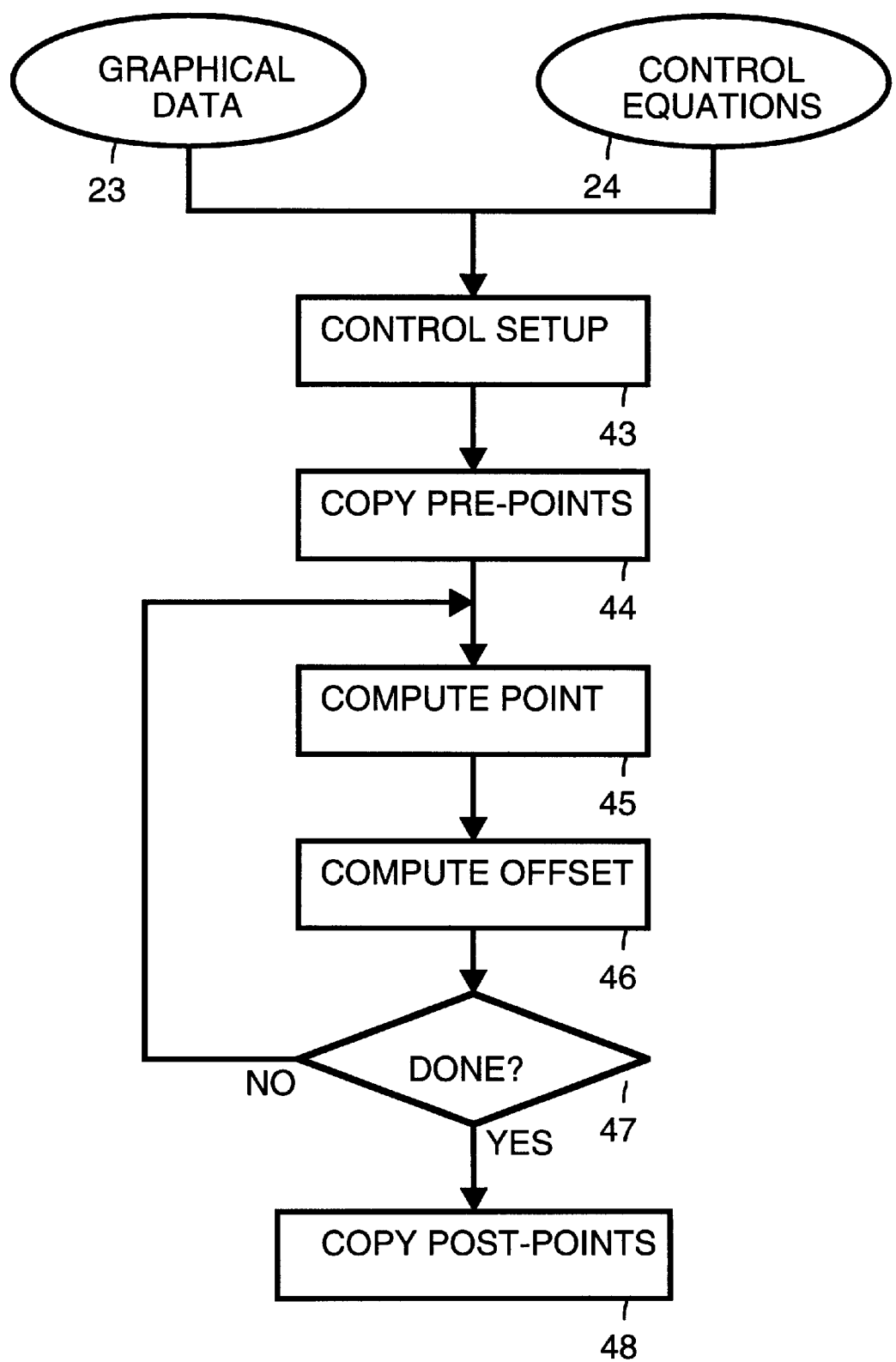
FIG. 3 is a simplified flowchart which illustrates flow of control data and graphic data through a polar controller in accordance with a preferred embodiment of the present invention.

FIG. 3 is a simplified flowchart which illustrates flow of control and data through a polar controller. The polar controller allows graphic shapes to be defined in the polar (angle, radius) coordinate system. For the polar controller the selected shape (shape) to be effected is defined. A construction (control) line is added to the selected shape. If the construction line does not intersect the selected shape, the polar execution engine generates the graphic shape by copying (i.e., repeating) the selected shape. When the construction line intersects the selected shape, the polar controller generates the graphic shape by stretching (i.e., expanding) the selected shape.

Graphical data 23 and control data 24 are read in by the polar controller. Graphical data 23 is, for example, a selected shape (which functions as a primitive) and a construction line. The selected shape, is for example, a path. Control data 24 includes information indicating a start angle, stop angle, step information, radius information, an x-offset and a y-offset.

In a control setup step 43, the polar controller checks for an intersection of the construction line and the selected shape and finds the cut point, i.e., the location at which the construction line intersects the selected shape. The polar controller also computes the draw direction of the compiled graphic. The polar controller also evaluates the start, step, and step control inputs.

In a copy pre-points step 44, the polar controller generates the first points for the compiled graphic. Since the construction line is specified as intersecting the selected shape, the graphic shape is drawn by expanding (i.e., stretching) the selected shape. In this case, first points are generated based on the points of the selected shape before the cut point (as defined by the construction line).

In a step 45, when the selected shape is expanded to generate the graphic shape, the polar controller uses the step information and radius information to generate an additional computed point. In a step 46, the polar controller uses an x-offset and a y-offset to compute offsets for the additional computed point generated in step 45. In a step 47, a check is made to see if the stop angle has been reached. If not additional points are computed. When the stop angle has been reached, in a step 48 the post-points are added to the graphic shape. The post-points are the points from the source shape that came after the cut point. These are the final points necessary to complete the graphic shape for the case where the graphic shape is drawn by expanding the selected shape.

Figure 4:
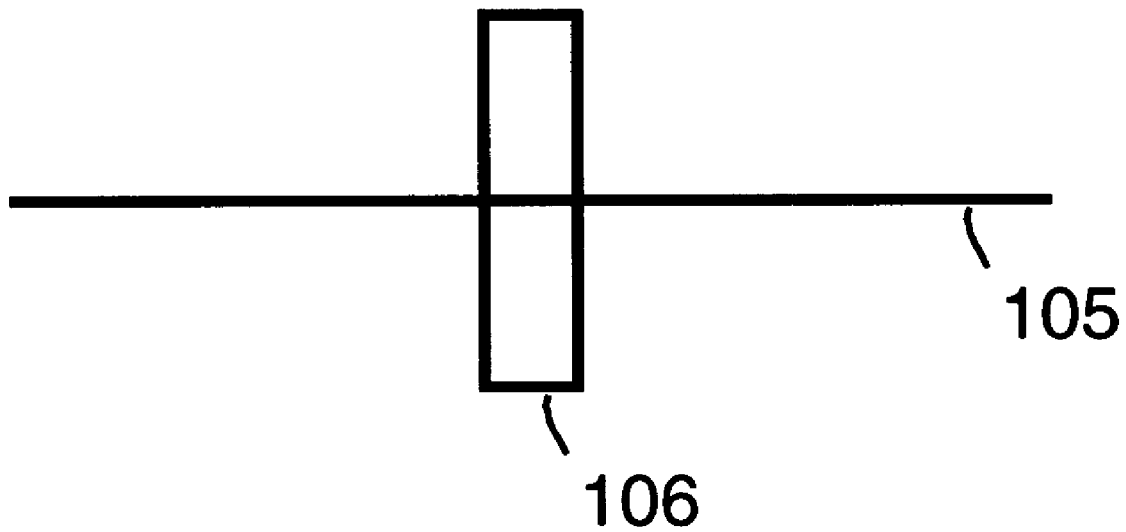
FIG. 4 is graphic data input which is a selected shape and a construction line used by a polar controller in accordance with a preferred embodiment of the present invention.

FIG. 4 gives an example of graphical data 23 used as input to a polar controller. A selected shape 106 is in this case a source path. Selected shape 106 is shown intersected by a construction line 105. Source path 106 and construction line 105 are, for example, within a layout window for a graphical editor. For example source path 106 is 25 mil wide. Selected shape 106 serves as a primitive for the generated graphic shape.

FIG. 5 shows a dialog box 70 used to receive, from a user, control data 24 used as input to a polar controller. When a user selects box 71, angle sweep values are interpreted as radians. When a user selects box 72, angle sweep values are interpreted as degrees.

In a box 73 a user indicates a start angle. The start angle can be a constant, a variable whose value is supplied by the user at insertion time, or an equation made up one or more variables and/or constants. In a box 74 a user indicates a stop angle. The stop angle can be a constant, a variable whose value is supplied by the user at insertion time, or an equation made up one or more variables and/or constants. In a box 75 a user indicates a step angle. The step angle can be a constant, a variable whose value is supplied by the user at insertion time, or an equation made up one or more variables and/or constants. In a box 76 a user indicates the length of the radius. The length of the radius can be a constant, a variable whose value is supplied by the user at insertion time, or an equation made up one or more variables and/or constants. In a box 77 a user indicates an x-offset for each step. The x-offset can be a constant, a variable whose value is supplied by the user at insertion time, or an equation made up one or more variables and/or constants. In a box 78 a user indicates a y-offset for each step. The y-offset can be a constant, a variable whose value is supplied by the user at insertion time, or an equation made up one or more variables and/or constants. When a user selects an OK button 79, all the values are entered into the system as control data 24. When the user selects a Cancel button 80, all the information just entered is discarded. A user can request help information by selecting a Help button 81.

The start angle, stop angle and step angle are evaluated and executed once by the polar controller. However, the length of the radius, the x-offset and the y-offset are evaluated by the polar controller for each step. This allows, for example, the polar controller to generate spiral-like shapes when the user specifies the length of the radius as a function of angle.

Figure 6:
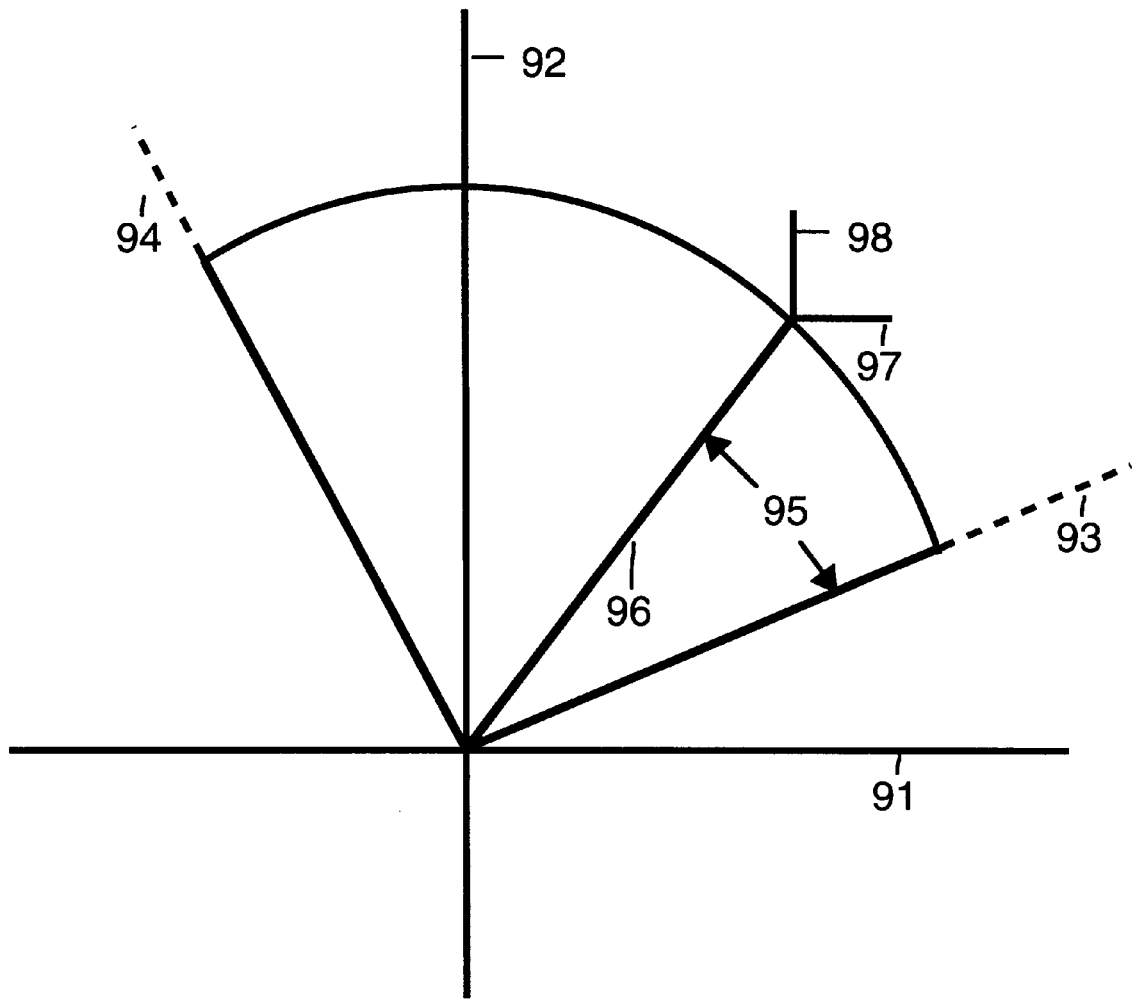
FIG. 6 is a guide which graphically represents parameters used by a polar controller in accordance with a preferred embodiment of the present invention.

FIG. 6 is a guide which graphically represents how user inputs received via dialog box 70 relate to one another. An x-axis 91 and a y-axis 92 are shown for reference. A line 93 indicates a start angle measured from x-axis 91. A line 94 indicates a stop angle measured from x-axis 91. An angle 95 indicates an incremental step distance that starts from line 93 and continues until stop angle 94. A radius length is represented by a line 96 originating from the intersection of x-axis 91 and y-axis 92. An x-offset 97 and a y-offset are shown extending from the top of line 96.

Figure 7:
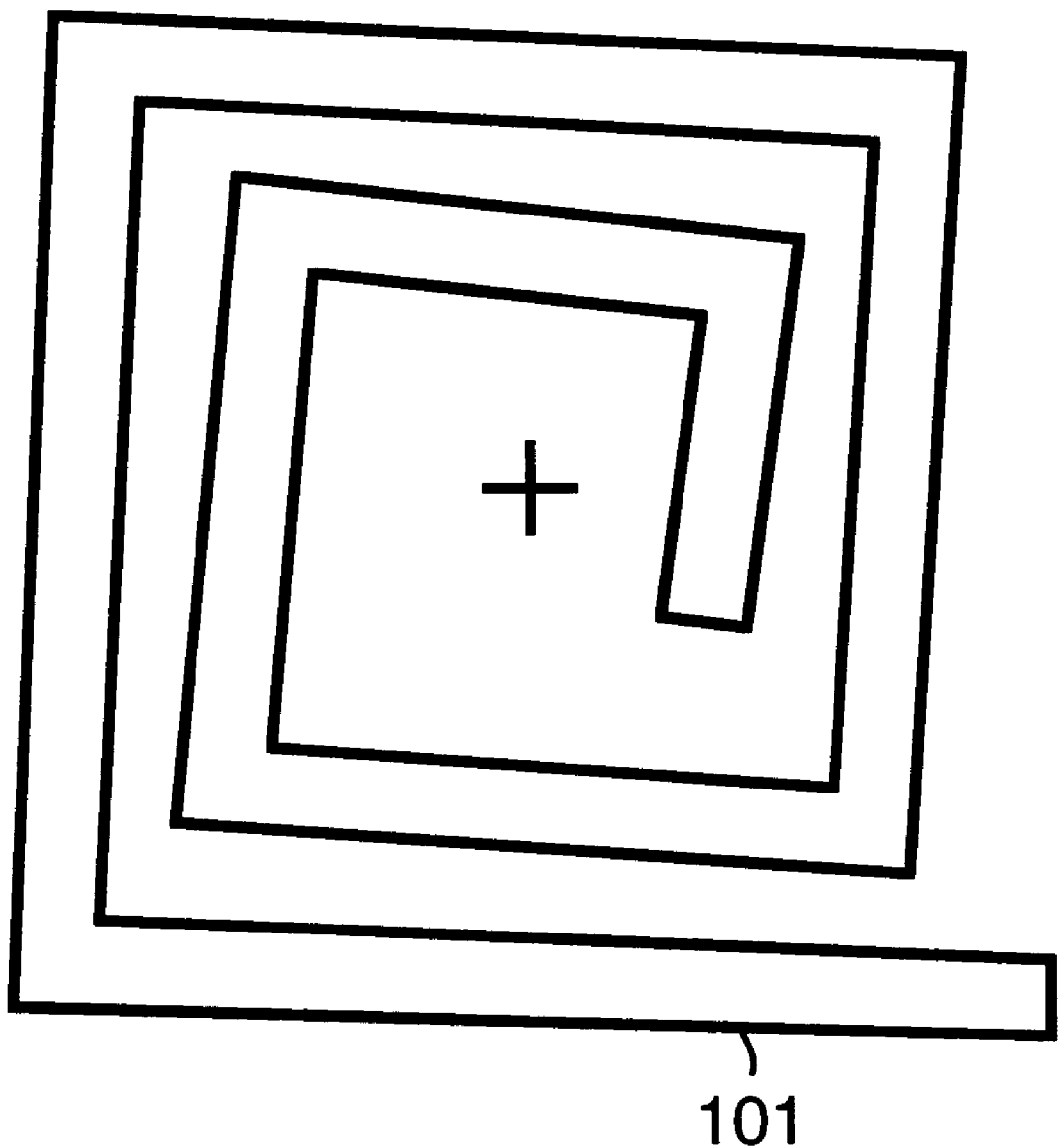
FIG. 7 is a spiral-like shape generated without x/y offset parameters using a polar controller in accordance with a preferred embodiment of the present invention.

FIG. 7 shows a resulting component 101 which was generated by a user selecting values using dialog box 70. For this example, the user has selected box 71, so that angle sweep values are interpreted as radians. In box 73 the user has indicated a start angle of 0. In box 74 the user has indicated stop angle of $4*\pi$. In box 75 the user has indicated a step angle of π/2. In box 76 the user has indicated the length of radius is equal to the equation (angle/(2*π))*50 mil/sin(π/2−π/4). In box 77 the user has indicated an x-offset for each step of 0 mil. In box 78 the user has indicated a y-offset for each step of 0 mil. The user then proceeded with entering the data into the system by selecting OK button 79. Because the length of the radius is an equation which is a function of angle, the resulting graphic shape is spiral-like.

Figure 8:
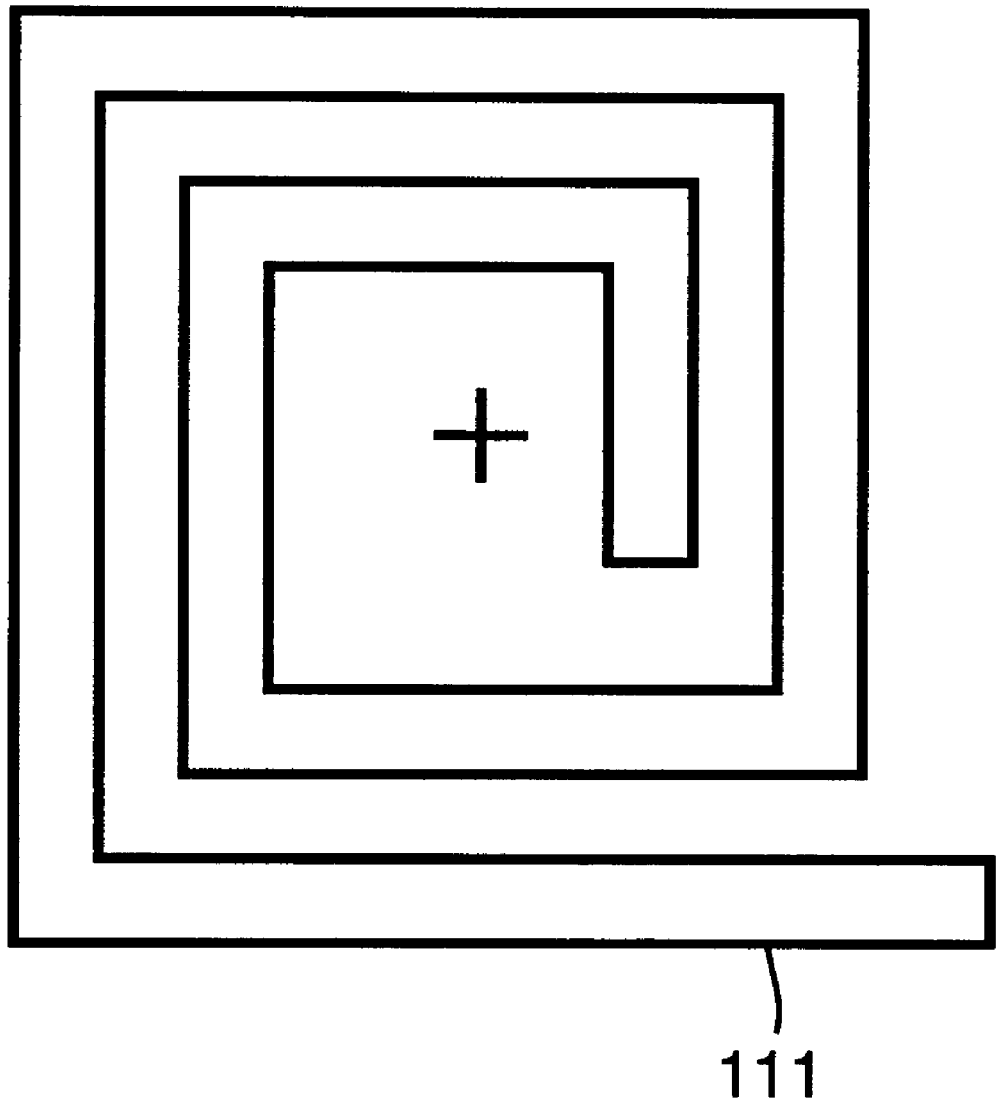
FIG. 8 is spiral-like shape generated with x/y offset parameters using a polar controller in accordance with a preferred embodiment of the present invention.

In order to make the spiral-like shape into a square shape the user can add x and y offsets. For example, FIG. 8 shows a resulting graph 111 which can be generated by a user selecting values using dialog box 70. For this example, the user has selected box 71, so that angle sweep values are interpreted as radians. In box 73 the user has indicated a start angle of 0. In box 74 the user has indicated stop angle of 4*π. In box 75 the user has indicated a step angle of π/2. In box 76 the user has indicated the length of radius is equal to the equation (angle/(2*π))*50 mil/sin(π/2−π/4). In box 77 the user has indicated an x-offset for each step of 50 mil/(8*(cos(angle+π/2−π/4)−sin(angle+π/2−π/4))). In box 78 the user has indicated a y-offset for each step of 50 mil/(8*(cos(angle+π/2−π/4)+sin(angle+π/2−π/4))). The user then proceeded with entering the data into the system by selecting OK button 79. Of course, the values given in this and the previous example are very specific to these particular examples. The values would differ significantly for a different line width, different number of sides, different number of turns, etc.

Figure 9:
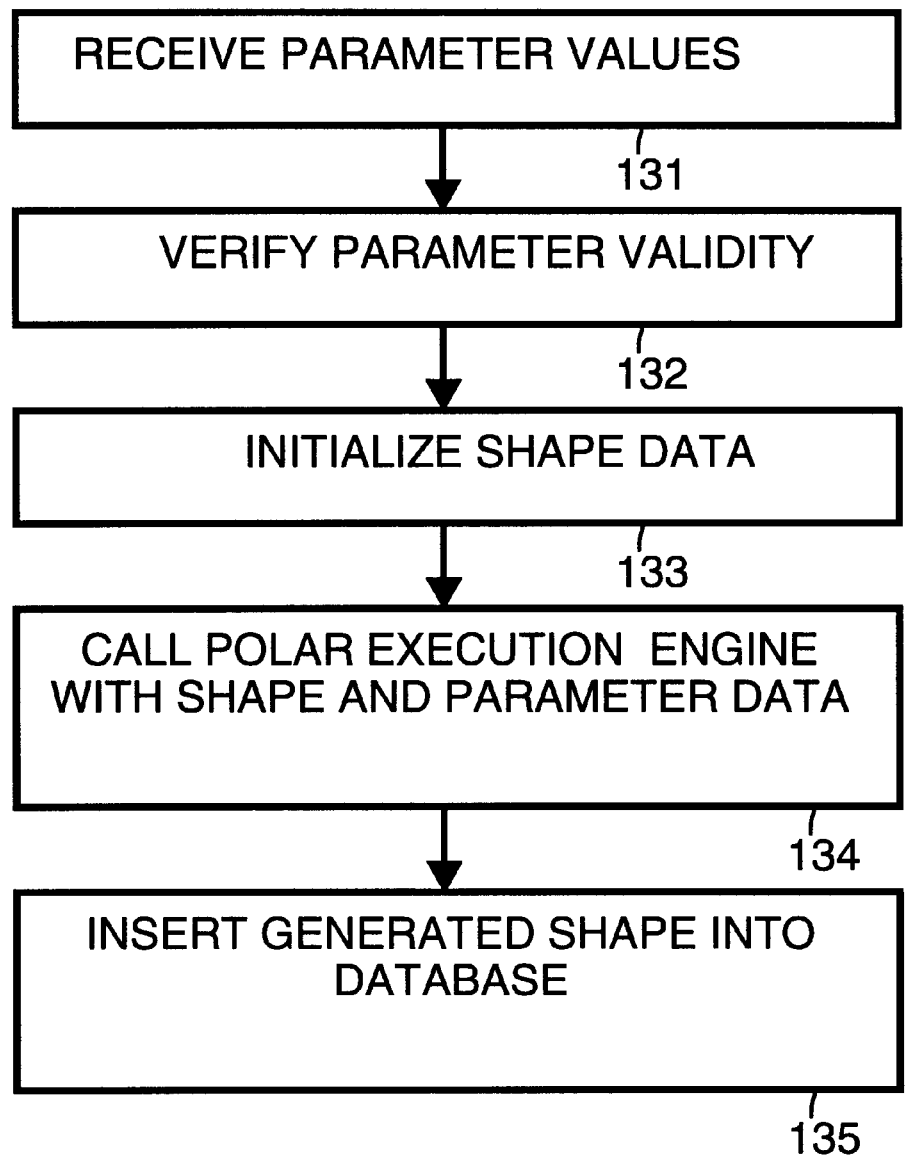
FIG. 9 is a flowchart which summarizes operation of a polar controller in accordance with a preferred embodiment of the present invention.

FIG. 9 summarizes operation of a polar controller. In a step 131, parameters are received from a user. In a step 132, validity of the parameters is verified. In a step 133, the graphic shape data is initialized. In a step 134, the parameters are prepared and the polar execution engine is called. The polar execution engine is called with the data for the source layout and all other controller parameters. In a step 135, the generated shape is inserted into a database. An example of code which loads the construction line, sends the construction line to the polar execution engine, evaluates the user-defined equations to generate a real value for start, stop and step angles, and calls the polar execution engine for the graphic is set out in Table 1 below:

TABLE 1

```
pam_set_cline_info(
        PAM_LINE_X1,         −0.003848608,
        PAM_LINE_Y1,         0,
        PAM_LINE_X2,         0.006342634,
        PAM_LINE_Y2,         0,
        PAM_LINE_DX,         1,
        PAM_LINE_DY,         0,
        PAM_LINE_SLOPE,             0);
decl p_start_1 = 0.0;
decl p_stop_1 = turns*2*PI;
decl p_step_1 = 2.0*PI/sides;
pam_rep = pam_do_polar(
        PAM_COMMON_INIT,     i_41663EA0,
        PAM_COMMON_DATA,     p_41663EA0,
        PAM_COMMON_PRIM,     PAM_PATH_TYPE,
        PAM_POLAR_DEGEN, 1,
        PAM_POLAR_UNITS, 1,
        PAM_POLAR_START, p_start_1,
        PAM_POLAR_STOP,         p_stop_1,
        PAM_POLAR_STEP,         p_step_1,
        PAM_POLAR_RADIUS,
        "angle/(2.0*PI)*(width+space)/sin(PI/2.0−PI/sides)",
        PAM_POLAR_OFFSETX,
        "(width+space)/(sides*2)*(cos(angle+PI/2.0−PI/sides)−
```

TABLE 1-continued

```
sin(angle+PI/2.0−PI/sides))",
        PAM_POLAR_OFFSETY,
        "(width+space)/(sides*2)*(cos(angle+PI/2.0−
PI/sides)+sin(angle+PI/2.0−PI/sides))");
l_41663EA0 = append(l_41663EA0, pam_rep);
```

Figure 10:
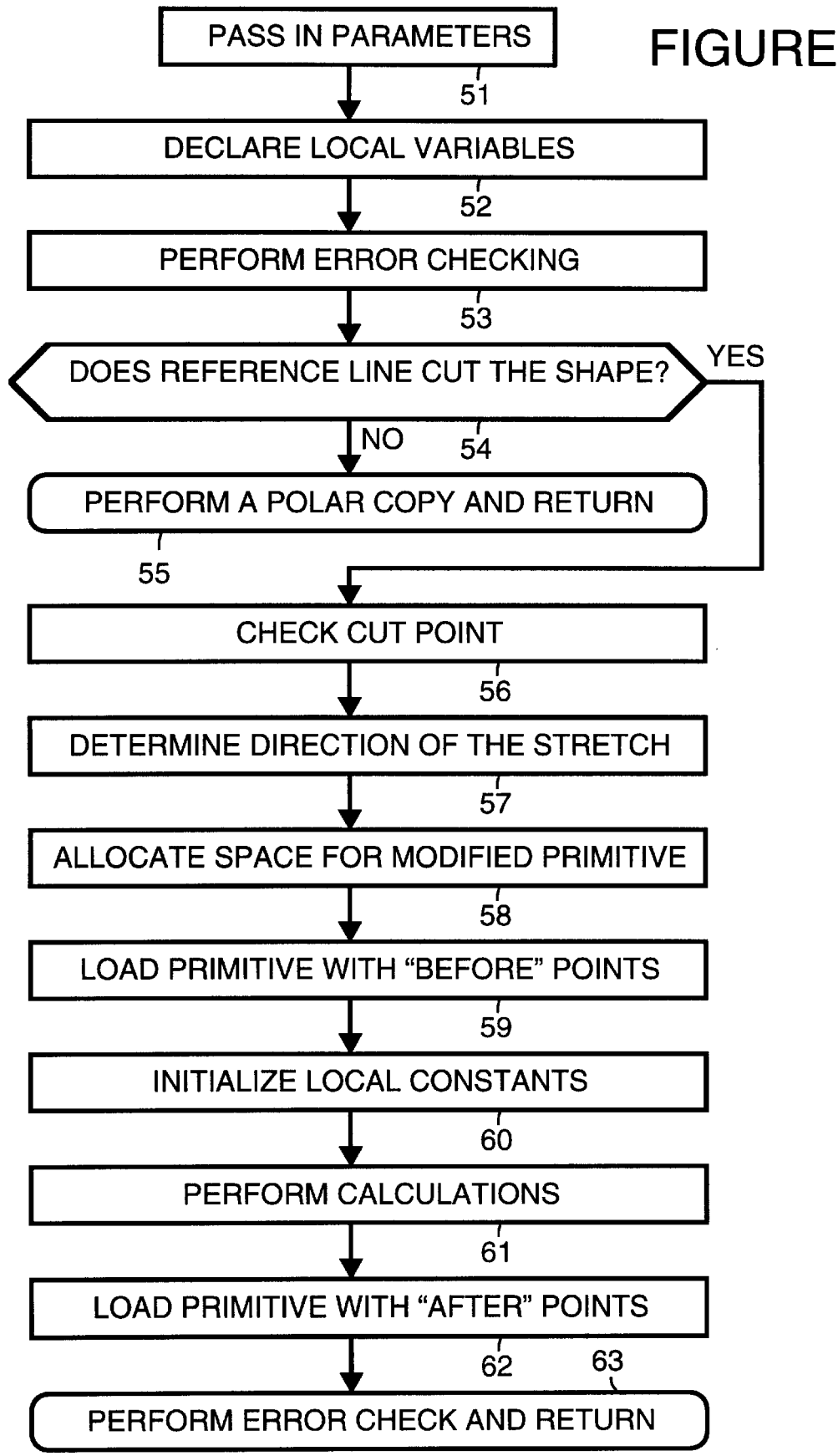
FIG. 10 is a flowchart which describes operation of a polar execution engine in accordance with a preferred embodiment of the present invention.

FIG. 10 is a flowchart which describes operation of a polar execution engine. In a step 51, all the parameters for the construction line, the selected shape being operated on are passed in. Table 2 below shows an example of code within a polar execution engine which receives the parameters.

TABLE 2

```
ValueT perform_polar_stretch(
        double x1,
        double y1,
        double x2,
        double y2,
        double dx,
        double dy,
        int degen,
        double start,
        double stop,
        double step,
        char *radius,
        char *offsetX,
        char *offsetY,
        PamPointT *init,
        PamPointT *data,
        int n)
```

In a step 52, local variables are declared. Table 3 below shows an example of code within a polar execution engine which declares the local variables.

TABLE 3

```
{
int add;       /* the number of points to add to the shape array */
int cut;       /* the vertex on or just past the cline cut point */
int dir;       /* the shape is CW or CCW in direction */
int reverse;   /* if -step or CW, traverse points in reverse order */
int skip;      /* cut line is ON a vertex, don't create new point */
int bound;     /* the upper-bound for the number of points */
int i, idx;
int offset;
long dim, *dimInfo;
ValueT arrayP;
PamPointT *tmp;
ValueT retVal;
double radian;
char Sangle[100];
ValueT Vangle;
double angle;
double rsin, rcos;   /* sin/cos for current radian (angle) */
double rx, ry;       /* the x/y components of radius */
double tx, ty;
double offX, offY;
```

In a step 53, error checking is performed. Table 4 below shows an example of code within a polar execution engine which performs the error checking.

TABLE 4

```
if (n<2)
        ERROR("Not enough points");
    add = (int)(fabs(start - stop)/step);
    if (add <= 0)                    /* nothing to stretch    */
        return(NULL_VALUE);
```

In a step 54, a check is made to see if the construction line cuts through the selected shape passed to the polar execution engine. Table 5 below shows an example of code within a polar execution engine which performs the check.

TABLE 5

```
for (i=1; i<n; i++) {
    if (line_intersect(x1, y1, x2, y2, init[i-1].x, init[i-1].y,
            init[i].x, init[i].y, &tx, &ty))
        break;
}
```

In a step 55, a polar copy and return is performed when the construction line does not cut through the selected shape passed to the polar execution engine. Table 6 below shows an example of code within a polar execution engine which performs the polar copy and return.

TABLE 6

```
if (i >= n) {                        /* not cut by the construction line */
    retVal = perform_polar_copy(x1, y1, x2, y2, dx, dy, degen,
        start, stop, step, radius, offsetX, offsetY, init, data, n);
    return(retVal);
}
```

In a step 56, a check is made to determine where the construction line cuts the selected shape, i.e., whether the construction line intersects the first point, the last point, or if the construction line cuts between points (e.g., mid segment). Table 7 below shows an example of code within a polar execution engine which performs the check.

TABLE 7

```
if (init[0].x == tx && init[0].y == ty) { /* cut the 0th point */
    cut = 0;
    skip = TRUE;
    tx = data[0].x;
    ty = data[0].y;
}
else if (init[i].x == tx && init[i].y == ty) {/* cut the 2nd point */
    cut = i;
    skip = TRUE;
    tx = data[i].x;
    ty = data[i].y;
}
else {                               /* cut mid-segment */
    double r, l1, l2;
    cut = i;
    skip = FALSE;
    l1 = fabs(sqrt(pow(init[i-1].x - tx, 2) +    /* length AP */
        pow(init[i-1].y - ty, 2)));
    l2 = fabs(sqrt(pow(init[i-1].x - init[i].x, 2) + /* length AB */
        pow(init[i-1].y - init[i].y, 2)));
    r = l1/l2;                       /* r = AP/AB */
    tx = data[i-1].x + r * (data[i].x - data[i-1].x); /* x = x1+r(x2-x1) */
    ty = data[i-1].y + r * (data[i].y - data[i-1].y); /* t = y1+r(y2-y1) */
}
```

In a step 57, a check is made to determine the direction of the stretch with respect to the direction of the selected shape so that no matter which way the selected shape is drawn or which way the selected shape is stretching the appearance of the final graphic will appear correct. Table 8 below shows an example of code within a polar execution engine which performs this check.

TABLE 8

```
dir = compute_direction(cut, tx, ty, data, n);
if (step * dir < 0.0)
        reverse = TRUE;
else
        reverse = FALSE;
bound = n + add;
if (skip)
        bound--;                     /* 'skip' the cline point */
if (n == 2 && degen)
        bound = add;                 /* drop the first and last points */
else
        degen = FALSE;
```

In a step 58, space is allocated for the modified selected shape. Table 9 below shows an example of code within a polar execution engine which performs the allocation.

TABLE 9

```
retVal = aval_create_list(1);
dim = 2;
dimInfo = aval_create_limits(dim, 0, bound, 0, 1);
arrayP = aval_create_array(AvalReal, dim, dimInfo, (void*)data);
aval_put_list_item(retVal, 0, arrayP);
tmp = (PamPointT *)aval_get_array_data(arrayP);
```

In a step 59, the modified selected shape is loaded with the points for the parts of the selected shape that appear before the reference line. The direction constituting "before" is based on the direction of the stretch and the orientation of the selected shape. Table 10 below shows an example of code within a polar execution engine which performs the load.

TABLE 10

```
offset = 0;
if (skip)
        offset = 1;
if (reverse) {
        idx = 0;
        for(i=n-1; i>=cut+offset; i--) {
                tmp[idx].x = data[i].x;
                tmp[idx].y = data[i].y;
                idx++;
        }
}
else
        idx = cut;
if (degen)
        idx = 0;
```

In a step 60, local constants are initialized in preparation for use by the user equations. These are the results of the user equations that get evaluated just one time. As discussed above, in the preferred embodiment the local constants which get evaluated one-time include the user-provided expressions for the start angle, the stop angle and the step angle. Table 11 below shows an example of code within a polar execution engine which performs the initialization.

TABLE 11

```
sprintf(Sangle, "angle_start = %g; angle_stop = %g; angle_step = %g",
                                            start, stop, step);
Vangle = autil_evaluate("CmdOp", Sangle);
```

In a step 61, the calculations are performed. This is the "real" work of the polar execution engine. In this step, the polar execution engine computes the next angle, sets the local variable with angle information, evaluates the user equation for the radius, evaluates the user equations for the x offset and the y offset, converts from polar to rectangular coordinates and computes the next (x,y) point based on the intersection point of the construction line and the selected shape modified with the (angle, radius) pair and the (x,y) offset. Table 12 below shows an example of code within a polar execution engine which performs these calculations.

TABLE 12

```
for (i=0; i<=add; i++) {           /* instead of start/stop/step */
        radian = start + ((long)i * step); /* this prevents rounding creep */
        sprintf(Sangle, "angle = %g; angle_i = %d", radian, i);
        Vangle = autil_evaluate("CmdOp", Sangle);
        angle = evaluate_equation(radius);
        sprintf(Sangle, "radius = %g", angle);
        Vangle = autil_evaluate("CmdOp", Sangle);
        offX = evaluate_equation(offsetX);
        offY = evaluate_equation(offsetY);
        rsin = sin(radian);
        rcos = cos(radian);
        rx = angle * rcos;
        ry = angle * rsin;
        tmp[idx].x = tx * rcos - ty * rsin + rx + offX;
        tmp[idx].y = tx * rsin + ty * rcos + ry + offY;
        idx++;
}
```

In a step 62, the points which occur after the intersection of the construction line and the selected shape are copied into the modified selected shape. Table 13 below shows an example of code within a polar execution engine which performs this copy.

TABLE 13

```
offset = 0;
if (skip || reverse)
        offset = 1;
if (degen)
        ;       /* do nothing */
else if (reverse) {
        for(i=cut-offset; i>=0; i--) {
                /* rx,ry and rsin/rcos are still set from above */
                tx = data[i].x;
                ty = data[i].y;
                tmp[idx].x = tx * rcos - ty * rsin + rx + offX;
                tmp[idx].y = tx * rsin + ty * rcos + ry + offY;
                idx++;
        }
}
else {
        for(i=cut+offset; i<n; i++) {
                /* rx,ry and rsin/rcos are still set from above */
                tx = data[i].x;
                ty = data[i].y;
                tmp[idx].x = tx * rcos - ty * rsin + rx + offX;
                tmp[idx].y = tx * rsin + ty * rcos + ry + offY;
                idx++;
        }
}
```

In a step 63, a check is made to make sure the resulting graphic has the right amount of points. Table 14 below shows an example of code within a polar execution engine which performs this check.

TABLE 14

```
if(idx - 1 != bound)
        ERROR("polar stretch array bounds error");
return(retVal);
}
```

In addition to a polar execution engine, a polar controller contains additional code which allows parameters specified by a user to be evaluated and used by the polar controller before the polar execution engine is called. This code is necesary as the parameters are coming from a generated AEL script and being passed to C code. For example, Table 15 below sets out code which unpacks parameters and calls a stretch version of the polar execution engine or a copy version of the polar execution engine:

TABLE 15

```
PUBLIC ValueT pam_do_polar_ael()
{
int numParms;
int cntParms;
int parmType;
int primType;
double x1, y1, x2, y2;
double dx, dy;
int degen;
int units;
double start, stop, step;
ValueT radius;
ValueT offsetX, offsetY;
ValueT arrP;
int n;
PamPointT *init;        /* pointer to array of (x,y) pairs */
PamPointT *data;        /* pointer to array of (x,y) pairs */
ValueT retVal;
degen = units = 0;
start = stop = step = 0.0;
numParms = arun_num_parm();
cntParms = 0;
if (numParms <= cntParms || numParms == 0)
        return(NULL_VALUE);
while (arun_peek_parm (cntParms) == AvalInteger) {
        if (!arun_get_int_parm(cntParms, (long *)&parmType ))
                RETURN(NULL_VALUE);
        cntParms++;
        if (numParms <= cntParms)
                return(NULL_VALUE);
        switch (parmType) {
                case PAM_COMMON_INIT:
                        if (!arun_get_typed_parm(cntParms++,
AvalArray, &arrP))
                                ERROR("error getting param array");
                        if (aval_array_type(arrP) != AvalReal)
                                ERROR("array not of real");
                        if (aval_get_array_order(arrP) != 2)
                                ERROR("array not of proper order");
                        if (aval_get_array_dim_max(arrP,2) != 1)     /* 0 rel
*/
                                ERROR("array not of proper dimensions");
                        n = aval_get_array_dim_max(arrP,1) + 1;
                        init = (PamPointT *)aval_get_array_data(arrP);
                        aval_free_value(arrP);
                        break;
                case PAM_COMMON_DATA:
                        if (!arun_get_typed_parm(cntParms++,
AvalArray, &arrP))
                                ERROR("error getting param array");
                        if (aval_array_type(arrP) != AvalReal)
                                ERROR("array not of real");
                        if (aval_get_array_order(arrP) != 2)
```

TABLE 15-continued

```
                ERROR("array not of proper order");
            if (aval_get_array_dim_max(arrP,2) != 1) /* 0 rel
*/
                ERROR("array not of proper dimensions");
            n = aval_get_array_dim_max(arrP,1) + 1;
            data = (PamPointT *)aval_get_array_data(arrP);
            aval_free_value(arrP);
            break;
        case PAM_COMMON_PRIM:
            if (!arun_get_int_parm(cntParms++, (long
*)&primType))
                ERROR("error getting param primType");
            break;
        case PAM_POLAR_DEGEN:
            if (!arun_get_int_parm(cntParms++, (long
*)°en))
                ERROR("error getting param degen");
            break;
        case PAM_POLAR_UNITS:
            if (!arun_get_int_parm(cntParms++, (long
*)&units))
                ERROR("error getting param units");
            break;
        case PAM_POLAR_START:
            if (!arun_get_real_parm(cntParms++, &start))
                ERROR("error getting param start");
            break;
        case PAM_POLAR_STOP:
            if (!arun_get_real_parm(cntParms++, &stop))
                ERROR("error getting param stop");
            break;
        case PAM_POLAR_STEP:
            if (!arun_get_real_parm(cntParms++, &step))
                ERROR("error getting param step");
            break;
        case PAM_POLAR_RADIUS:
            if (!arun_get_typed_parm(cntParms++,
AvalString,
                                          &radius))
                ERROR("error getting param radius");
            break;
        case PAM_POLAR_OFFSETX:
            if (!arun_get_typed_parm(cntParms++,
AvalString,
                                          &offsetX))
                ERROR("error getting param offsetX");
            break;
        case PAM_POLAR_OFFSETY:
            if (!arun_get_typed_parm(cntParms++,
AvalString,
                                          &offsetY))
                ERROR("error getting param offsetY");
            break;
        default:
            cntParms++;
            MESS("extra parameter");
            ;
        }
    }
    x1 = ConstLine.pt1.x;
    y1 = ConstLine.pt1.y;
    x2 = ConstLine.pt2.x;
    y2 = ConstLine.pt2.y;
    dx = ConstLine.delta.x;
    dy = ConstLine.delta.y;
    if (units == PAM_POLAR_DEGREES) {
        start /= 180.0/PI;
        stop /= 180.0/PI;
        step /= 180.0/PI;
    }
    if((step == 0.0) ||
       (step < 0.0 && start < stop) ||
       (step > 0.0 && start > stop)) {
        if (!DisplayedError)
            aerr_process_error(APAM_ERR(APAM_WARN_STEP_INF),
NULL);
        DisplayedError = TRUE;
        return(NULL_VALUE);
    }
```

TABLE 15-continued

```
    get_copy_limit();
    if (fabs(start - stop)/step > (double)CopyLimit) {
        if (!DisplayedError)
            aerr_process_error(APAM_ERR(APAM_WARN_STEP_MAX
),
                   "CELL_COMPILER_MAX_COPY = %d",
CopyLimit);
        DisplayedError = TRUE;
        return(NULL_VALUE);
    }
    switch (primType) {
        case PAM_POLYGON_TYPE:
        case PAM_PORT_TYPE:
        case PAM_CIRCLE_TYPE:
            retVal = perform_polar_copy(x1, y1, x2, y2, dx, dy,
                degen, start, stop, step, aval_value_data(radius),
                        aval_value_data(offsetX),
aval_value_data(offsetY),
                init, data, n);
            break;
        case PAM_POLYLINE_TYPE:
        case PAM_PATH_TYPE:
            retVal = perform_polar_stretch(x1, y1, x2, y2, dx, dy,
                degen, start, stop, step, aval_value_data(radius),
                        aval_value_data(offsetX),
aval_value_data(offsetY),
                init, data, n);
            break;
        default:
            ERROR("Invalid primitive type");
    }
    aval_free_value(radius);
    aval_free_value(offsetX);
    aval_free_value(offsetY);
    return(retVal);
}
```

Figure 11:
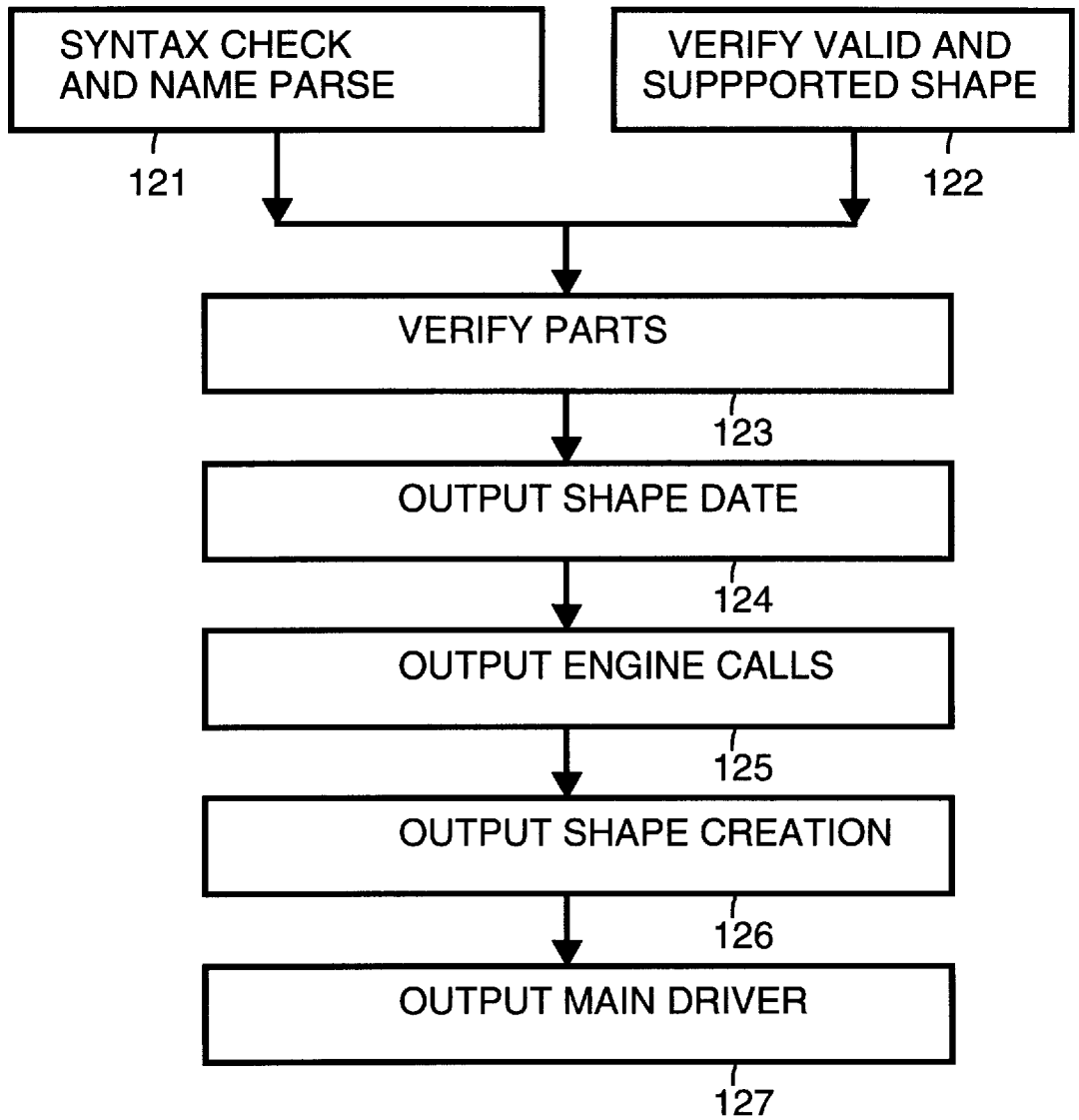
FIG. 11 is a flowchart which describes generation of a graphics language macro in accordance with a preferred embodiment of the present invention.

When a graphical cell compiler (e.g., macro compiler 25) is used to generate a Parameterized Artwork Macro (PAM), the graphical cell compiler combines the source shape(s) and construction line (graphical data 23), and the equations entered in dialog box 70 (e.g., control data 24), and the user supplied parameter values entered by user at insertion time (e.g., as represented by step 134 shown in FIG. 9), to generate graphical shapes. FIG. 11 is a flowchart which gives a simplified description of how the values entered in dialog box 70 along with a selected shape and construction line can be used to generate a graphics language macro which will generate a graphic shape. In the preferred embodiment, the graphics language macro is written in AEL. Alternatively, other system specific macro languages could be used. In a step 121, shown in FIG. 11, a syntax check and name parse is performed on equations placed in any entry box in dialog box 70. The syntax check and name parse is performed to verify the equations and to collect the parameter names. Any name not identified by the system as a built-in is taken as a parameter name to be defined by the user at insertion time.

In a step 122, a graphic shape entered from a layout editor are evaluated in order to verify the graphic shape is valid and supported by the polar controller.

In a step 123 the parts entered are all verified, i.e., it is verified that the necessary parts are present and valid. The parts include the controller input by the user, the shape input via the layout editor and the construction line.

In a step 124, shape data is output. That is, the variables (e.g., point locations) which define the selected shape are loaded into variables for the graphics language macro.

In a step 125, the calls to a polar execution engine are generated. In a step 126, the output shape is created.

In a step 127, a main driver is produced, the main driver makes, procedure calls to procedures constructed in steps 124, 125 and 126.

The graphics language macro (e.g., an AEL script) generated from the flowchart shown in FIG. 11, is stored in a data base and can be accessed by a user to insert an instance of the generated shape into a window of a layout editor.

Table 16 below gives an example of code which creates name mappings between the internal macro language AEL and the programming language C.

TABLE 16

```
DEF_FUNCTION("pam_set_cline_info",
    pam_set_cline_info_ael        ),
DEF_FUNCTION("pam_do_polar",    pam_do_polar_ael),
```

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A computer implemented method for generating a graphic shape comprising the following steps:

(a) providing opportunity for a user to specify an expression for a start angle;

(b) providing opportunity for the user to specify an expression for a stop angle;

(c) providing opportunity for the user to specify an expression for a step angle;

(d) providing opportunity for the user to specify an expression for a radius length, wherein the radius length is expressed as a function of angle;

(e) providing opportunity for the user to specify a selected base shape; and, (f) generating code which when executed creates the graphic shape which is displayed in a layout window, the selected base shape serving as a base shape which is modified in a way controlled by the step angle and radius length in order to produce the graphic shape, wherein the selected base shape is modified in one of the following ways:

expanding the selected base shape along a path determined by the step angle and radius length, making copies of the selected base shape at locations determined by the step angle and radius length.

2. A computer implemented method as in claim 1 wherein in step (f) execution of the generated code includes the following substeps:

(f.1) evaluating once any equation the user uses to specify the start angle;

(f.2) evaluating once any equation the user uses to specify the stop angle;

(f.3) evaluating once any equation the user uses to specify the step angle; and (f.4) evaluating for each step any equation the user uses to specify the radius length.

3. A computer implemented method as in claim 1 additionally comprising the following steps performed before step (f):

(g) providing opportunity for the user to specify an expression for an x offset so that the x offset is not a constant; and, (h) providing opportunity for the user to specify an expression for a y offset so that the y offset is not a constant;

wherein in step (f) the graphic shape is also generated based on the x offset and the y offset.

4. A computer implemented method as in claim 3 wherein in step (f) execution of the generated code includes the following substeps:

(f.5) evaluating for each step any equation the user uses to specify the x-offset; and, (f.6) evaluating for each step any equation the user uses to specify the y-offset.

5. A computer implemented method as in claim 1 additionally comprising the following step performed before step (f):

(g) providing opportunity for the user to specify a construction line;

wherein in step (f) the graphic shape is also generated based on the construction line.

6. A computer implemented method as in claim 5 wherein in step (f) execution of the generated code includes the following substeps:

(f.1) when the construction line does not intersect the selected base shape, the graphic shape is generated by copying the selected base shape; and, (f.2) when the construction line intersects the selected base shape, the graphic shape is generated by expanding the selected base shape.

7. A computer implemented method for generating a graphic shape comprising the following steps:

(a) providing opportunity for a user to specify an expression for a start angle;

(b) providing opportunity for the user to specify an expression for a stop angle;

(c) providing opportunity for the user to specify an expression for a step angle;

(d) providing opportunity for the user to specify an expression for a radius length, wherein the radius length is expressed as a function of angle;

(e) providing opportunity for the user to specify an expression for an x offset so that the x offset is not a constant;

(f) providing opportunity for the user to specify an expression for a y offset so that the y offset is not a constant; and (g) generating the graphic shape based on the start angle, the stop angle, the step angle, the radius length, the x offset and the y offset, including the following substeps:

(g.1) evaluating once any equation the user uses to specify the start angle, (g.2) evaluating once any equation the user uses to specify the stop angle, (g.3) evaluating once any equation the user uses to specify the step angle, (g.4) evaluating for each step any equation the user uses to specify the radius length, (g.5) evaluating for each step any equation the user uses to specify the x-offset, and (g.6) evaluating for each step any equation the user uses to specify the y-offset.

8. A computer implemented method for generating a graphic shape comprising the following steps:

(a) providing opportunity for a user to specify an expression for a start angle;

(b) providing opportunity for the user to specify an expression for a stop angle;

(c) providing opportunity for the user to specify an expression for a step angle;

(d) providing opportunity for the user to specify an expression for a radius length, wherein the radius length is expressed as a function of angle;

(f) providing opportunity for the user to specify a selected base shape;

(g) providing opportunity for the user to specify a construction line; and, (h) generating the graphic shape based on the start angle, the stop angle, the step angle and the radius length, the selected base shape, including the following substep:

(h.1) when the construction line intersects the selected base shape, the graphic shape is generated by expanding the selected base shape along a path determined by the step angle and radius length.

9. A computer implemented method as in claim 8 wherein step (h) additionally includes the following substep:

(h.2) when the construction line does not intersect the selected base shape, the graphic shape is generated by copying the selected base shape at locations determined by the step angle and radius length.

10. A polar controller, comprising:

an interface for providing opportunity for a user to specify a selected base shape for a graphic shape and to specify an expression for a start angle, an expression for a stop angle, an expression for a step angle and an expression for a radius length for the graphic shape, the radius length being expressed as a function of angle;

a compiler process for generating code, based on the start angle, the stop angle, the step angle, the radius length and the selected base shape, which when executed generates the graphic shape, wherein the graphic shape is generated in one of the following ways:

expanding the selected base shape along a path determined by the step angle and radius length, making copies of the selected base shape at locations determined by the step angle and radius length.

11. A polar controller as in claim 10 wherein the compiler process additionally generates the code for the graphic shape based on a construction line, wherein when the construction line intersects the selected base shape, the compiler process generates the code so that when executed the code generates the graphic shape by expanding the selected base shape along a path determined by the step angle and radius length.

12. A polar controller as in claim 11 wherein when the construction line does not intersect the selected base shape, the compiler process generates the code so that when executed the code generates the graphic shape by making copies of the selected base shape at locations determined by the step angle and radius length.

13. A polar controller, comprising:

an interface for providing opportunity for a user to specify for a graphic shape an expression for a start angle, an expression for a stop angle, an expression for a step angle, an expression for a radius length, an expression for an x offset which is not a constant and an expression for a y offset which is not a constant, the radius length being expressed as a function of angle;

a compiler process for generating code, based on the start angle, the stop angle, the step angle, the radius length, the x offset and the y offset, which when executed generates the graphic shape;

an execution engine for executing the code, wherein the execution engine evaluates once any equation the user uses to specify the start angle, evaluates once any equation the user uses to specify the stop angle, evaluates once any equation the user uses to specify the step angle, evaluates for each step any equation the user uses to specify the radius length, evaluates for each step any equation the user uses to specify the x-offset, and evaluates for each step any equation the user uses to specify the y-offset.

14. Storage media which stores software that, when executed, performs a method for generating a graphic shape, the method comprising the following steps:

(a) providing opportunity for a user to specify an expression for a start angle;

(b) providing opportunity for the user to specify an expression for a stop angle;

(c) providing opportunity for the user to specify an expression for a step angle;

(d) providing opportunity for the user to specify an expression for a radius length, wherein the radius length is expressed as a function of angle;

(e) providing opportunity for the user to specify a selected base shape; and, (f) generating code which when executed creates the graphic shape which is displayed in a layout window, the selected base shape serving as a base shape which is modified in a way controlled by the step angle and radius length in order to produce the graphic shape, wherein the selected base shape is modified in one of the following ways:

expanding the selected base shape along a path determined by the step angle and radius length, making copies of the selected base shape at locations determined by the step angle and radius length.

15. Storage media as in claim 14 wherein in step (f) execution of the generated code includes the following substeps:

(f.1) evaluating once any equation the user uses to specify the start angle;

(f.2) evaluating once any equation the user uses to specify the stop angle;

(f.3) evaluating once any equation the user uses to specify the step angle; and (f.4) evaluating for each step any equation the user uses to specify the radius length.

16. Storage media as in claim 14 wherein the method additionally comprises the following steps performed before step (f):

(g) providing opportunity for the user to specify an expression for an x offset so that the x offset is not a constant; and, (h) providing opportunity for the user to specify an expression for a y offset so that the y offset is not a constant;

wherein in step (f) the graphic shape is also generated based on the x offset and the y offset.

17. Storage media as in claim 16 wherein in step (f) execution of the generated code includes the following substeps:

(f.5) evaluating for each step any equation the user uses to specify the x-offset; and, (f.6) evaluating for each step any equation the user uses to specify the y-offset.

18. Storage media as in claim 14 wherein the method additionally comprises the following step performed before step (f):

(g) providing opportunity for the user to specify a construction line;

wherein in step (f) execution of the generated code includes the following substeps:

(f.1) when the construction line does not intersect the selected base shape, the graphic shape is generated by copying the selected base shape, and (f.2) when the construction line intersects the selected base shape, the graphic shape is generated by expanding the selected base shape.

19. Storage media which stores software that, when executed, performs a method for generating a graphic shape, the method comprising the following steps:

(a) providing opportunity for a user to specify an expression for a start angle;

(b) providing opportunity for the user to specify an expression for a stop angle;

(c) providing opportunity for the user to specify an expression for a step angle;

(d) providing opportunity for the user to specify an expression for a radius length, wherein the radius length is expressed as a function of angle;

(e) providing opportunity for the user to specify an expression for an x offset so that the x offset is not a constant; and, (f) providing opportunity for the user to specify an expression for a y offset so that the y offset is not a constant; and (g) generating the graphic shape based on the start angle, the stop angle, the step angle, the radius length, the x offset and the y offset, including the following substeps:

(g.1) evaluating once any equation the user uses to specify the start angle, (g.2) evaluating once any equation the user uses to specify the stop angle, (g.3) evaluating once any equation the user uses to specify the step angle, (g.4) evaluating for each step any equation the user uses to specify the radius length, (g.5) evaluating for each step any equation the user uses to specify the x-offset, and (g.6) evaluating for each step any equation the user uses to specify the y-offset.

20. Storage media which stores software that, when executed, performs a method for generating a graphic shape, the method comprising the following steps:

(a) providing opportunity for a user to specify an expression for a start angle;

(b) providing opportunity for the user to specify an expression for a stop angle;

(c) providing opportunity for the user to specify an expression for a step angle;

(d) providing opportunity for the user to specify an expression for a radius length, wherein the radius length is expressed as a function of angle; and, (f) providing opportunity for the user to specify a selected base shape;

(g) providing opportunity for the user to specify a construction line;

(h) generating the graphic shape based on the start angle, the stop angle, the step angle and the radius length, the selected base shape, including the following substep:

(h.1) when the construction line intersects the selected base shape, the graphic shape is generated by expanding the selected base shape along a path determined by the step angle and radius length.

21. Storage media as in claim 20 wherein step (h) additionally includes the following substep:

(h.2) when the construction line does not intersect the selected base shape, the graphic shape is generated by making copies of the selected base shape at locations determined by the step angle and radius length.

* * * * *